United States Patent
Yang et al.

(10) Patent No.: US 10,250,698 B2
(45) Date of Patent: Apr. 2, 2019

(54) SYSTEM AND METHOD FOR SECURING PRE-ASSOCIATION SERVICE DISCOVERY

(71) Applicant: Futurewei Technologies, Inc., Plano, TX (US)

(72) Inventors: Yunsong Yang, San Diego, CA (US); Zhigang Rong, San Diego, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 314 days.

(21) Appl. No.: 14/832,607

(22) Filed: Aug. 21, 2015

(65) Prior Publication Data

US 2016/0057237 A1 Feb. 25, 2016

Related U.S. Application Data

(60) Provisional application No. 62/041,470, filed on Aug. 25, 2014.

(51) Int. Cl.
*H04L 29/06* (2006.01)
*H04L 29/08* (2006.01)
(Continued)

(52) U.S. Cl.
CPC ............ *H04L 67/16* (2013.01); *H04L 63/123* (2013.01); *H04W 4/00* (2013.01); *H04W 12/06* (2013.01); *H04W 12/10* (2013.01); *H04W 84/12* (2013.01)

(58) Field of Classification Search
CPC ....... H04L 29/08; H04L 67/16; H04L 63/123; H04W 84/12; H04W 8/005; H04W 12/10; H04W 12/06; H04W 4/00
See application file for complete search history.

(56) References Cited

U.S. PATENT DOCUMENTS 6,766,453 B1 * 7/2004 Nessett ............... H04L 9/0844
455/410
6,920,559 B1 * 7/2005 Nessett ............... H04L 9/0822
380/247
(Continued)

FOREIGN PATENT DOCUMENTS

CN    101127877 A  *  2/2008
EP    1605627 A1      12/2005
(Continued)

OTHER PUBLICATIONS

"IEEE Standard for Information Technology—Telecommunications and information exchange between systems—Local and metropolitan area networks—Specific Requirements, IEEE Draft P802.11-REVmb/D12, Part:11 Wireless LAN Medium Access Control (MAC) and Physical Layer (PHY) Specification," 802.11 Working Group, Nov. 2011, 2,910 pages.

(Continued)

*Primary Examiner* — Benjamin M Thieu
(74) *Attorney, Agent, or Firm* — Slater Matsil, LLP

(57) ABSTRACT

A method for operating a station when discovering a service includes generating a first identifier of the service, generating a second identifier of the service in accordance with a first parameter, and transmitting a request instructing a generating of a third identifier, the request including the first identifier of the service and the first parameter. The method includes receiving a first response including the third identifier, determining that the first response is not valid when the second and third identifiers are not equal, and determining that the first response is valid when the second and third identifiers are equal.

39 Claims, 10 Drawing Sheets

(51) Int. Cl.
*H04W 4/00* (2018.01)
*H04W 12/06* (2009.01)
*H04W 12/10* (2009.01)
*H04W 84/12* (2009.01)

(56) References Cited

U.S. PATENT DOCUMENTS

| | | | | |
|---|---|---|---|---|
| 7,492,744 | B2* | 2/2009 | Dooley | H04L 29/12254 370/338 |
| 7,996,434 | B2* | 8/2011 | Palanisamy | G06F 17/30604 707/707 |
| 8,401,554 | B2* | 3/2013 | Melkote | H04W 16/02 455/435.2 |
| 8,483,169 | B2* | 7/2013 | Melkote | H04W 16/02 370/328 |
| 8,589,559 | B2* | 11/2013 | Smyth | G06F 17/30905 709/206 |
| 8,872,939 | B2* | 10/2014 | Sato | H04L 63/08 348/231.2 |
| 9,898,503 | B2* | 2/2018 | Beskrovny | G06F 17/30424 |
| 2003/0177186 | A1* | 9/2003 | Goodman | H04L 67/104 709/205 |
| 2006/0148402 | A1* | 7/2006 | Hagiwara | H04L 9/3271 455/41.1 |
| 2007/0141988 | A1 | 6/2007 | Kuehnel et al. | |
| 2008/0178004 | A1* | 7/2008 | Wei | H04L 63/0869 713/171 |
| 2008/0215883 | A1 | 9/2008 | Fok et al. | |
| 2011/0302643 | A1* | 12/2011 | Pichna | H04L 63/0892 726/7 |
| 2014/0007196 | A1* | 1/2014 | Lin | G06F 21/31 726/4 |
| 2015/0113052 | A1* | 4/2015 | Chen | H04L 67/16 709/203 |
| 2015/0134552 | A1* | 5/2015 | Engels | H04W 4/80 705/318 |
| 2015/0226458 | A1* | 8/2015 | Miles | F24J 2/1047 126/652 |
| 2016/0191408 | A1* | 6/2016 | Yajima | H04L 12/4641 709/225 |

FOREIGN PATENT DOCUMENTS

| | | |
|---|---|---|
| EP | 1811744 A1 | 7/2007 |
| EP | 2928262 A1 | 10/2015 |
| JP | 2009537898 A | 10/2009 |
| JP | 2010511965 A | 4/2010 |
| WO | 0018162 A1 | 3/2000 |
| WO | 02065258 A2 | 8/2002 |
| WO | 2007136622 A2 | 11/2007 |
| WO | 2008070686 A2 | 6/2008 |
| WO | 2011144081 A2 | 11/2011 |
| WO | 2014084519 A1 | 6/2014 |

OTHER PUBLICATIONS

"P802.11aq/D0.01 Draft Trial-Use Standard for for Information technology—Telecommunications and information exchange between systems Local and metropolitan area networks—Specific requirements: Wireless LAN Medium Access Control (MAC) and Physical Layer (PHY) Specifications—Amendment: Pre-Association Discovery," P802.11aq/D0.01, Jun. 2014, 24 pages.

Wi-Fi Alliance, "Wi-Fi Direct Services Technical Specification Version 1.0," Apr. 10, 2014, 100 pages.

Wi-Fi Alliance Technical Task Group, "Wi-Fi Technical Specification Contribution," Version 0.0 (TG Baseline r187) Wi-Fi Neighbor Awareness Networking (NAN), recieved Aug. 20, 2015, 91 pages.

* cited by examiner

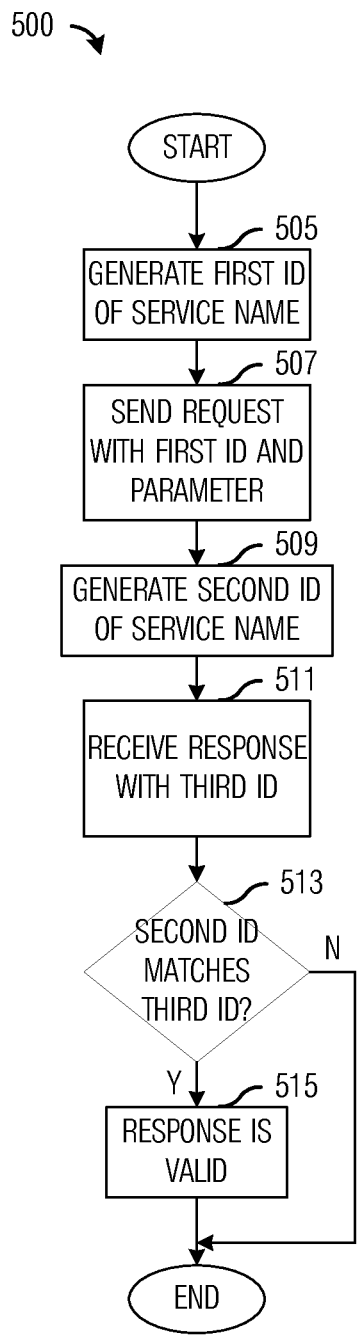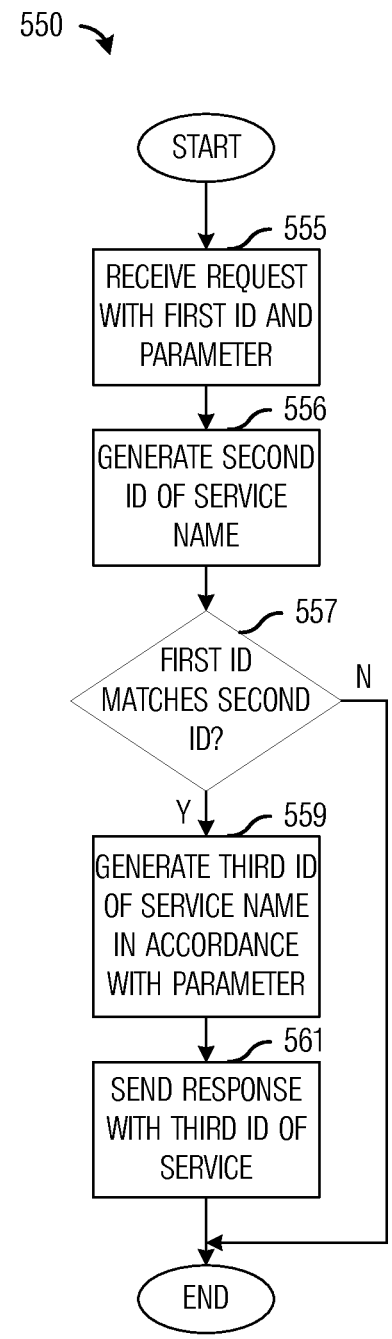
Fig. 5A
Fig. 5B

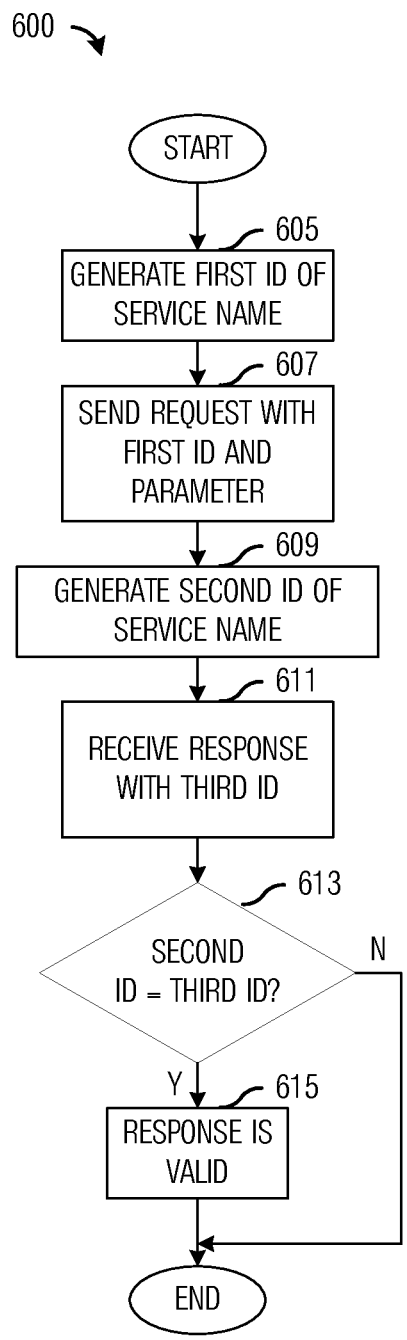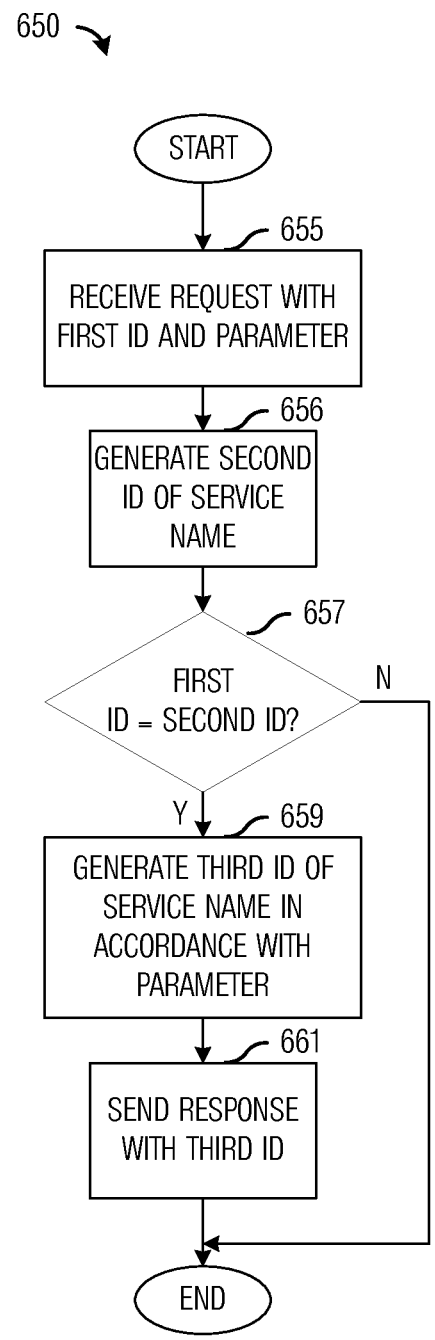
Fig. 6A
Fig. 6B

SYSTEM AND METHOD FOR SECURING PRE-ASSOCIATION SERVICE DISCOVERY

This application claims the benefit of U.S. Provisional Application No. 62/041,470, filed on Aug. 25, 2014, entitled "Method and System for Securing Pre-association Service Discovery," which application is hereby incorporated herein by reference.

TECHNICAL FIELD

The present disclosure relates generally to digital communications, and more particularly to a system and method for securing pre-association service discovery.

BACKGROUND

The IEEE 802.11 family of technical standards and attendant technology, also commonly referred to as Wi-Fi, is evolving towards a service-centric model of connectivity where devices connect for a specific purpose. The purposeful connections are triggered by applications looking for networks and/or peer devices that support specific services. Examples of these services include file sharing, printing, media streaming, and the like.

A Wi-Fi connection is typically established after successful completion of authentication, association, and, in some cases, the Internet Protocol (IP) address assignment, after which service data may be exchanged between the devices. There may be a significant amount of signaling overhead and delay incurred by the authentication, association, and IP address assignment procedures, which may only be warranted if the connected device is capable of providing the requested services. To avoid unnecessary delay, a device may conduct pre-association service discovery to identify devices and the services that the devices provide without performing the authentication and association procedures first. Mechanisms for securing pre-association service discovery are desired.

SUMMARY OF THE DISCLOSURE

Example embodiments provide a system and method for securing pre-association service discovery.

In accordance with an example embodiment, a method for operating a station when discovering a service is provided. The method includes generating, by the station, a first identifier of the service, generating, by the station, a second identifier of the service in accordance with a first parameter, and transmitting, by the station, a request instructing a generating of a third identifier, the request including the first identifier of the service and the first parameter. The method includes receiving, by the station, a first response including the third identifier, determining, by the station, that the first response is not valid when the second and third identifiers are not equal, and determining, by the station, that the first response is valid when the second and third identifiers are equal.

In accordance with another example embodiment, a station adapted to discover a service is provided. The station includes a processing unit, a transmitter operatively coupled to the processing unit, and a receiver operatively coupled to the processing unit. The processing unit generates a first identifier of the service, generates a second identifier of the service, where the second identifier is generated in accordance with a first parameter, determines that a first response is not valid when the second identifier and a third identifier are not equal, and determines that the first response is valid when the second and third identifiers are equal. The transmitter transmits a request instructing a generating of a third identifier, the request including the first identifier of the service and the first parameter. The receiver receives a first response including the third identifier.

In accordance with another example embodiment, a method for operating a station when advertising a service is provided. The method includes receiving, by the station, a request including a first identifier and a first parameter, generating, by the station, a second identifier of the service, and when determining, by the station, that the first and second identifiers are equal, generating, by the station, a third identifier of the service in accordance with the first parameter, and transmitting, by the station, a first response including the third identifier of the service.

In accordance with another example embodiment, a station adapted to advertise a service is provided. The station includes a receiver, a processing unit operatively coupled to the receiver, and a transmitter operatively coupled to the processing unit. The receiver receives a request including a first identifier and a first parameter. The processing unit generates a second identifier of the service, and when the first and second identifiers are equal, generates a third identifier of the service in accordance with the first parameter. The transmitter transmits a first response including the third identifier of the service.

Practice of the foregoing embodiments secure pre-association service discovery by encrypting service names to help protect subscriber privacy.

Moreover, security is further enhanced through the use of hash matching different truncated hash outputs, and nonces.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 5A illustrates a flow diagram of example operations occurring in a subscriber performing secured pre-association service discovery according to example embodiments described herein;

FIG. 5B illustrates a flow diagram of example operations occurring in a publisher performing secured pre-association service discovery according to example embodiments described herein;

FIG. 6A illustrates a flow diagram of example operations occurring in a subscriber performing secured pre-association service discovery, wherein the parameter indicates a portion of the hash output according to example embodiments described herein;

FIG. 6B illustrates a flow diagram of example operations occurring in a publisher performing secured pre-association service discovery, wherein the parameter indicates a portion of the hash output according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the embodiments disclosed herein, and do not limit the scope of the disclosure.

One embodiment relates to securing pre-association service discovery. For example, a station generates a first identifier of the service, generates a second identifier of the service in accordance with a first parameter, and transmits a request instructing a generating of a third identifier, the request including the first identifier of the service and the first parameter. The station also receives a first response including the third identifier, determines that the first response is not valid when the second and third identifiers are not equal, and determines that the first response is valid when the second and third identifiers are equal.

The embodiments will be described with respect to example embodiments in a specific context, namely wireless communications systems that support service centric connections and pre-association operations to discover services prior to the establishment of a connection. The embodiments may be applied to standards compliant wireless communications systems, such as those that are compliant with IEEE 802.11aq, IEEE 802.15.8 Peer Aware Communications (PAC), the Wi-Fi Alliance (WFA) Neighbor Awareness Networking (NAN), the WFA Wi-Fi Direct Services (WFDS), the WFA Application Service Platform (ASP) 2.0, the Third Generation Partnership Project (3GPP) Device-to-Device (D2D), and the like, technical standards, and non-standards compliant communications systems, that support service centric connections and pre-association discovery.

Figure 1:
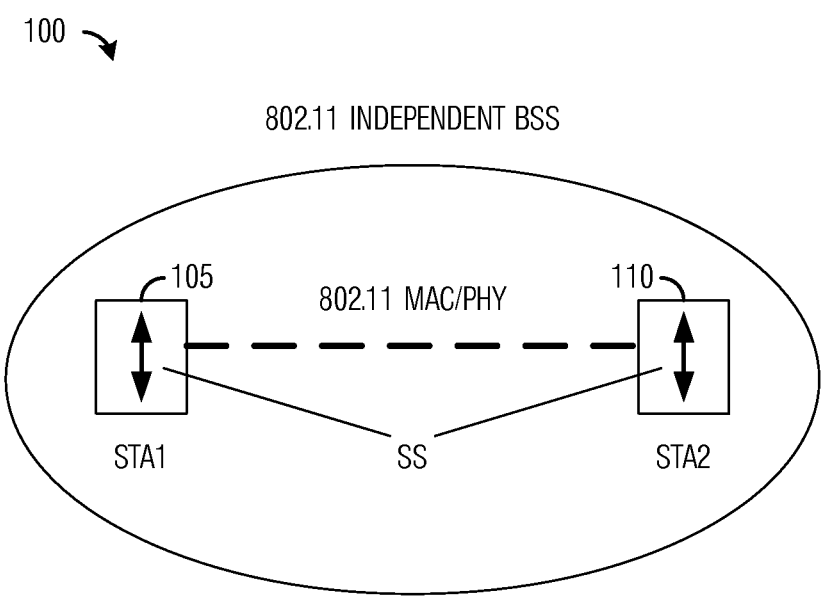
FIG. 1 illustrates an example communications system according to example embodiments described herein.

FIG. 1 illustrates an example communications system 100. Communications system 100 includes two stations, STA1 105 and STA2 110, forming a basic service set (BSS). A station is also often referred as a device, terminal, user equipment (UE), mobile station (MS), communication node, user, etc. These two stations directly communicate with each other using 802.11 media access control (MAC) and physical (PHY) layer signaling without the help of a centralized network equipment such as an access point (AP), NodeB, eNodeB (eNB), base station (BS), or communication controller. This type of communications is also known as ad-hoc or peer-to-peer (P2P) communications. Wi-Fi P2P, which is also known as Wi-Fi Direct, is an example of such a P2P communications technology using the Institute of Electrical and Electronics Engineers (IEEE) 802.11 air interface standard and has become increasingly popular among many smart-phones, printers, and consumer electronics. The Wi-Fi Direct specification was developed by the Wi-Fi Alliance (WFA) based on the IEEE 802.11 standard. Recently, the Wi-Fi Alliance further augmented Wi-Fi Direct with a new Wi-Fi Direct Services (WFDS) specification, which enhances the service discovery and service level interoperability for Wi-Fi Direct.

While it is understood that BSS may employ multiple stations, only two stations are illustrated for simplicity. Additionally, communications systems may also employ multiple APs to perform AP controlled communications, for example, but no APs are shown in FIG. 1.

Figure 2:
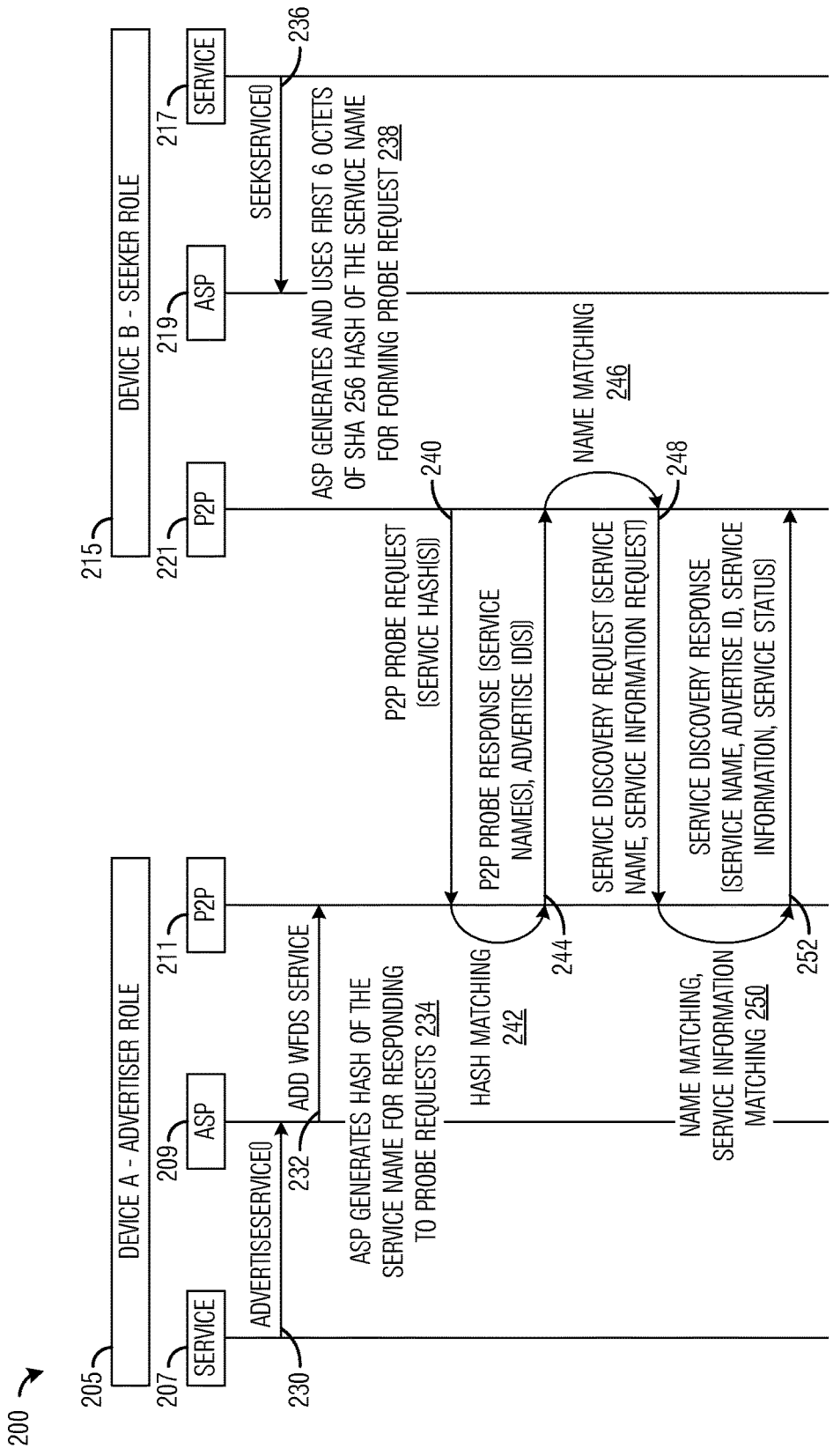
FIG. 2 illustrates an example message exchange diagram highlighting messages exchanged during a discovery of a service at a peer station (or device)

FIG. 2 illustrates a message exchange diagram 200 highlighting messages exchanged during a discovery of a service at a peer station (or device). In WFDS, a service is represented by a Universal Coded Character Set+Transformation Format-8-bit (UTF-8) string of the service name. For example, the service name defined in the WFDS specification for printer service is "org.wi-fi.wfds.print.tx". The WFA further recommends using "reverse domain name notation" for service names of services not defined by the WFA. Besides the service name, a short identifier known as the Service Hash may also be used to represent the service. A Service Hash is the first 6 octets of the hash output of SHA-256 hash function with the service name as the input to the hash function, for example.

Message exchange diagram 200 displays messages exchanged and processing performed by a Device A 205 that is operating in an advertiser role and a Device B 215 that is operating in a seeker role. In the example embodiments of the disclosure, advertiser is an interchangeable term for publisher, and seeker is an interchangeable term for subscriber. Device A 205 and Device B 215 each includes multiple layers, such as service layer (207 and 217 for Device A 205 and Device B, respectively), application service platform (ASP) layer (209 and 219 for Device A 205 and Device B, respectively), and peer-to-peer (P2P) media access control (MAC) layer (211 and 221 for Device A 205 and Device B, respectively). The details of the layers below the P2P MAC layers, such as the physical (PHY) layers, are intentionally omitted to help to simplify FIG. 2. Service layer 207 of Device A 205 may initiate an Advertise Service( ) procedure with ASP layer 209 of Device A 205 with one or more service_name_advertiser(s), each of which is a service name of a service provided by Device A 205 (shown as event 230). Event 230 results in ASP layer 209 of Device A 205 adding a WFDS service (shown as event 232). ASP layer 209 of Device A 205 may also generate a Service Hash for each service_name_advertiser (shown as event 234).

Service layer 217 of Device B 215 may initiate a Seek-Service( ) procedure with ASP layer 219 of Device B 215 with one or more service_name_seeker(s), each of which is a service name of a service desired by Device B 215 (shown as event 236). Event 236 results in ASP layer 219 of Device B 215 generating a Service Hash for each service_name_seeker (shown as event 238). ASP layer 219 of Device B 215 may use a portion of the hash output of the service_name_seeker, e.g., the first 6 octets of the hash output, for generating a Service Hash. P2P MAC layer 221 may send a P2P Probe Request including one or more Service Hash(s) (shown as event 240).

Device A 205 may perform a check to determine if its Service Hash (generated from service_name_advertiser) matches a Service Hash received in the P2P Probe Request (generated by the seeker (i.e., Device B 215) from service_name_seeker) (shown as Hash Matching 242). If there is a match, Device A 205 may send a P2P Probe Response including the service_name_advertiser of the matched Service Hash (shown as event 244). Device B 215 may perform a check to determine if the service_name_advertiser received from Device A 205 matches the service_name_seeker (shown as Name Matching 246). If there is a match, Device B 215 may transmit a Service Discovery (SD) Request frame with the service_name_seeker and a request for additional service information to Device A 205 (shown as event 248). Then, Device A may perform service name matching and service information matching (shown as "Name Matching, Service Information Matching" 250) and respond back with the requested additional service information in an SD Response frame (shown as event 252).

As shown in FIG. 2, the plain-text service name(s) are used in Probe Response and SD Request/Response frames, which are not protected by any Layer 2 security or privacy protection measures according to WFDS specifications, due to their nature of being pre-association management frames. The exposed service names may be used by an unintended recipient to profile the user or to infer private information about the user. As an example, a service running on a mobile healthcare device may be named in a way that is related to a medical condition that the device is used for. Thus, the service name, when exposed in a plain-text form, may indicate that the user of the device has that particular medical condition.

A neighbor awareness networking (NAN) certification program and specification is currently being developed by the Wi-Fi Alliance NAN Marketing and Technical Task Groups to provide Wi-Fi technology with a low-power mechanism that is run in devices in the background to make the devices neighbor aware. With the NAN technology, mobile devices can efficiently discover people and services in their proximity. It is envisioned that the typical applications for NAN include Wi-Fi based mobile social networking, mobile commerce, mobile advertising, wireless multi-player gaming, etc.

Figure 3:
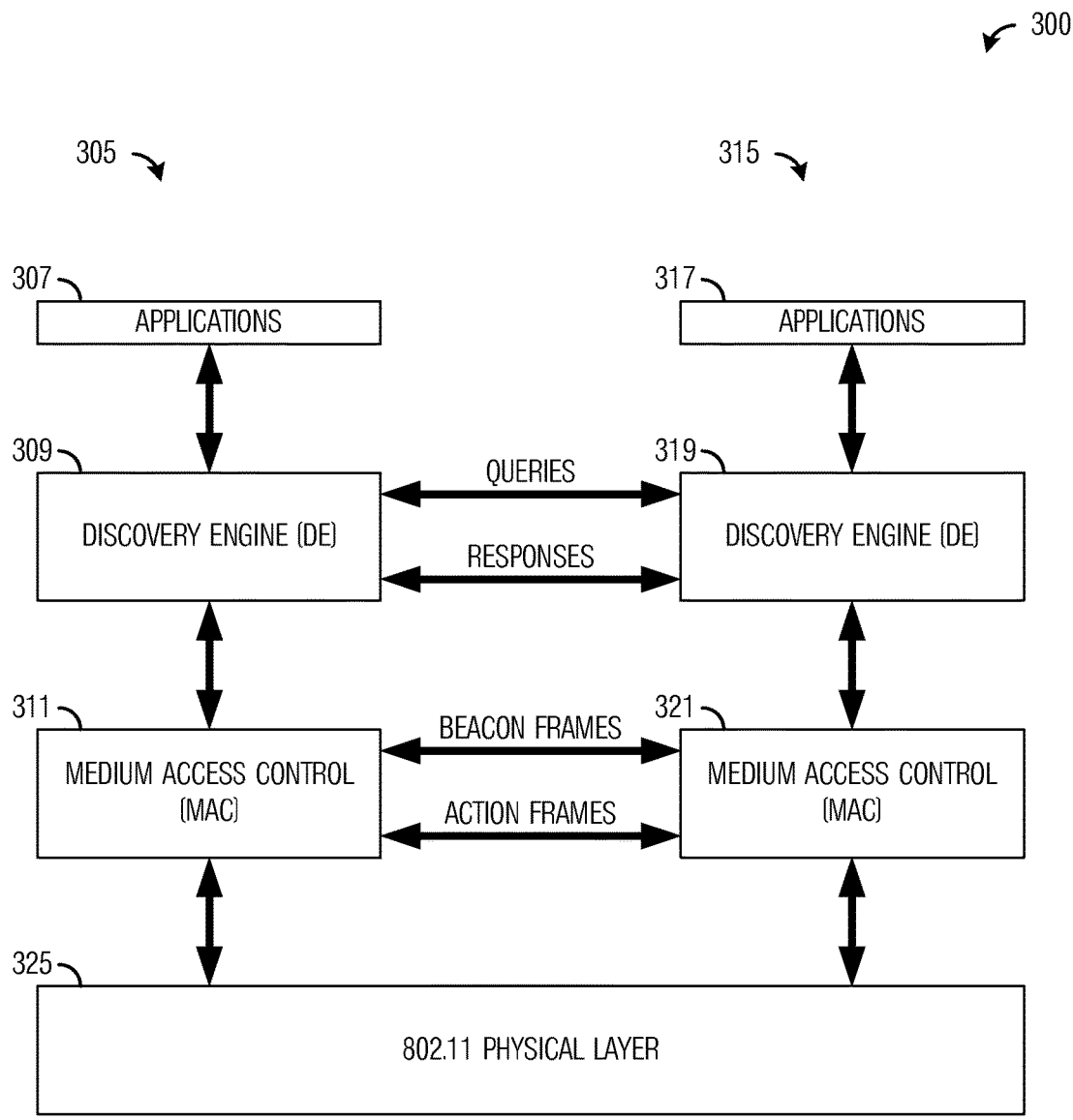
FIG. 3 illustrates an example communications system highlighting interactions between two NAN devices as they perform service discovery.

FIG. 3 illustrates a communications system 300 highlighting interactions between two NAN devices as they perform service discovery. As shown in FIG. 3, interactions between two NAN devices (NAN device 305 and NAN device 315) and the NAN components within these NAN devices (such as applications 307 and 317, discovery engines (DE) 309 and 319, and MAC layers 311 and 321) as the NAN devices perform service discovery over an 802.11 Physical Layer 325 in accordance with the draft Wi-Fi Alliance NAN specification v0.0r18. The AdvertiseService and SubscribeService commands are provided by the Applications to the NAN DEs via the application programming interfaces (APIs). The NAN DEs process the AdvertiseService or SubscribeService command received, based on which, the NAN Discovery Engine generates and provides the Publish or Subscribe message to the NAN MAC components. The NAN MAC components are responsible for processing and handling the NAN Beacon frames and Service Discovery frames, which carries the Publish or Subscribe messages. The NAN Service Discover frame uses the IEEE 802.11 Public Action frame format with a Wi-Fi Alliance defined vendor-specific contents, to provide the detailed service information (e.g., Publish message) or the detailed service query (e.g., Subscribe message).

In NAN, the plain-text service name is not used in any NAN protocol messages over the air. Instead, a Service Identifier (ID), which is exactly the same truncated cryptographic hash of the service name that has been previously described as the Service Hash in WFDS, is used in NAN protocol messages to identify a service. However, the remaining contents in the NAN Service Queries and Service Responses carried in the NAN Service Discovery frames are not protected at the MAC sublayer. As a result, private information such as the service information of the service being queried, the post-discovery connection information, which often includes the device's global MAC address, may be exposed to an unintended recipient, who may use the service information to profile a user and/or use the MAC address to track a user. This is also true in other pre-association discovery mechanisms, such as WFDS service discovery and IEEE 802.11aq, due to the lack of authentication and association before the exchanges of service queries and service responses.

Figure 4:
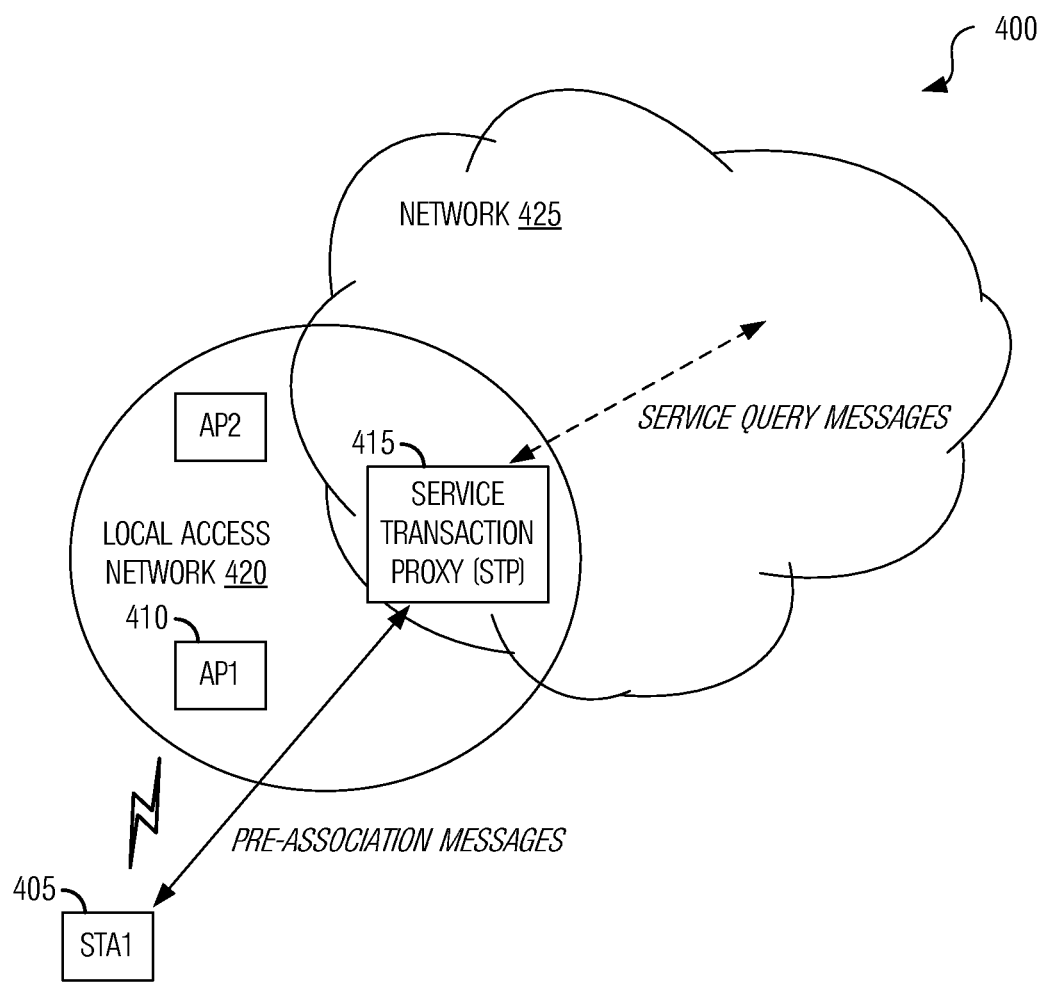
FIG. 4 illustrates an architecture and network elements of an example communications system that have been proposed to IEEE 802.11 TGaq for pre-association discovery.

IEEE 802.11 Task Group AQ (TGaq) is currently developing a pre-association discovery (PAD) technique to allow Wi-Fi devices to discover services offered in the wireless local area network (WLAN) before making association with the access point. FIG. 4 illustrates an architecture and network elements of an example communications system 400 that have been proposed to IEEE 802.11 TGaq for pre-association discovery. Communications system 400 includes a station STA1 405, an access point AP1 410 serving stations such as station STA1 405 using Wi-Fi, and a service transaction proxy (STP) entity 415 connected with AP1 410. STP 415 may be connected with other access points, such as AP2, of local area network 420 as well. STP 415 is a logical entity that caches a list of services and associated service information. STP 415 may also be coupled to a network 425, where it can obtain information regarding services and associated service information from advertisers in network 425, for example. The stations, such as STA1 405, may send service query messages to STP 415 and receive service response messages from STP 415 via an access point, such as AP1 410, of local area network 420 prior to performing an association procedure with the access point, such as AP1 410. Between the STA1 405 and AP1 410, the service query and service response messages are transported over the IEEE 802.11aq MAC sublayer using generic advertisement service (GAS) request frames and GAS response frames, which are similar to the way that the NAN Publish and Subscribe messages are transported over the NAN MAC sublayer using the NAN Service Discovery frames as shown in FIG. 3. STP 415 and AP1 410 are typically connected using wire-line. Thus, between STP 415 and AP1 410, the service query and service response messages may be transported using a wire-line-based protocol such as Diameter or Remote Authentication Dial In User Service (RADIUS).

As discussed above, private information may be leaked out to unintended recipients in both the WFDS and NAN, which may lead to security vulnerabilities. As an example, a hacker's device receives the WFDS P2P Probe Response and SD Response frames from a legitimate service advertiser (which provides the hacker a service name thereof), allowing the hacker to pretend to be a legitimate service advertiser elsewhere by advertising the Service ID, which is generated from the service name that it found in the WFDS P2P Probe Response and SD Response frames, in the NAN Publish messages that the hacker's device transmits, in order to lure a service seeker to send WFDS P2P Probe Requests. In response to the WFDS P2P Probe Request from a service seeker, the hacker's device replays the stolen service name and service information by including them in the WFDS P2P Probe Response and SD Response that the hacker's device sends to the service seeker, making it looks as if a legitimate service advertiser is responding to the service seeker. Then, the hacker's device may use the WFDS procedure to set up a P2P connection with the legitimate service seeker. Once the IP layer and Transport layer connections are established, the hacker may start to send junk information, such as advertisements, and the like, to the legitimate service seeker.

As another example, a hacker's device receives a legitimate service provider's Service ID from the NAN Publish message that the service provider sends. The hacker's device pretends to be a service seeker and sends a WFDS P2P Probe Request to the service provider by replaying the same Service ID as the Service Hash in the WFDS P2P Probe Request (since the Service Hash in WFDS and the Service ID in NAN for the same service name are exactly the same). After determining that the Service Hash matches, the service provider responds with a WFDS P2P Probe Response including the service name. Then, the hacker's device may further send WFDS SD Query to request for service information. Then, the hacker's device may use the WFDS procedure to set up a Wi-Fi P2P connection with the legitimate service provider. Once the IP layer and Transport layer connections are established, the hacker may start to send junk information, such as advertisements, and the like, to the legitimate service provider.

Therefore, it is desirable that a service advertiser can verify the authenticity of a service seeker before further service discovery exchanges are allowed, and vice versa.

In the draft WFA NAN specification, it is stated that a group of devices can use the NAN Publish and Subscribe functions in a secured manner by using a shared secret key, e.g., the NAN Group Key. The NAN Service ID can be further secured by replacing the Service ID with a pseudo random Secure Service ID, which is formed by hashing the service name with the NAN Group Key. And the NAN Service Information can be secured by encrypting the service information, e.g., using NAN Master Group Key and the AES-SIV algorithm. However, using shared group key requires additional steps to establish the group membership and to distribute the shared secret keys first. And if the service information is relatively static, such as the service name, the encrypted service information may still be subject to re-play attacks, unless the shared group key is changed frequently.

Thus, one aspect of the disclosure is to provide Layer 2 transport for carrying messages of Layer 2 or higher layers during the initial exchanges of pre-association service discovery query and response. In some embodiments, these Layer 2 or higher layer messages may be used for verifying the authenticity of the advertiser/publisher or seeker/subscriber before further service discovery exchanges are allowed or before certain service information are disclosed; for establishing the shared secret keys for protecting the privacy of the service related information during the subsequent service discovery query, response, and follow-up messages; and/or for indicating or requesting a pre-specified format to represent or to protect the service information in the subsequent service discovery and/or provisioning negotiation messages.

According to an example embodiment, subscribers and publishers exchange service query and service response messages that include service identifiers with a parameter that indicates how the service identifiers are generated or selected in the message currently being sent and/or in a message to be received in response to the message currently being sent. The dynamic generation or selection of the service identifiers help to ensure that the privacy of the subscribers is protected by verifying the authenticity of the publishers and the subscribers.

FIG. 5A illustrates a flow diagram of example operations 500 occurring in a subscriber performing secured pre-association service discovery. Operations 500 may be indicative of operations occurring in a subscriber as the subscriber performs secured pre-association service discovery with a publisher.

Operations 500 may begin with the subscriber generating a first identifier of a service name of a service that the subscriber is looking for (block 505). The subscriber may send a request, i.e., a service query message, with the first identifier and a parameter to the publisher (block 507). An identifier, such as the first identifier, may be a truncated hash output of the application of a hash function, such as SHA-256, to a service name, such as the service name of the service that the subscriber is seeking. The parameter may comprise a first indication indicating how to generate a third identifier, which is to be included in a response, i.e., a service response message, to represent a matched service. As an illustrative example, the first indication indicates a first truncated portion of a hash output to use in generating the third identifier in the response. As another illustrative example, the first indication indicates a first random number (i.e., a first nonce) to use in generating the third identifier in the response to the service request. The first indication in the parameter is used by the subscriber to generate a challenge to the publisher in order to verify the authenticity of the publisher through the publisher's response to the challenge, which is the third identifier included in the service response. The parameter may comprise a second indication that is used to indicate how to generate an identifier used in hash matching with the first identifier. As an illustrative example, the second indication indicates a second truncated portion of a hash output to use in hash matching with the first identifier. As another illustrative example, the second indication indicates a second random number (i.e., a second nonce) to use in generating the identifier used in hash matching with the first identifier. Detailed discussion of example embodiments involving the use of the parameters are provided below.

The subscriber may generate a second identifier of the service name of the service that the subscriber is looking for (block 509). The second identifier is generated in accordance with the first indication in the parameter included in the request sent by the subscriber. The subscriber may receive a response, i.e., a service response message, with the third identifier from the publisher (block 511). The third identifier is generated by the publisher from the service name of the matched service (i.e., from which the identifier generated for hash matching matches with the first identifier) that the publisher is providing and is generated in accordance with the first indication in the parameter sent by the subscriber. The subscriber may perform a check to determine if the second identifier matches with the third identifier (block 513). If the second identifier matches with the third identifier, the response is valid (block 515) and pre-association service discovery may complete or the subscriber may proceed with further discovery of detailed service information of the matched service with the publisher. If the second identifier does not match with the third identifier, the response is not valid and pre-association service discovery with the publisher may be aborted or the subscriber may repeat pre-association service discovery with another publisher. It is noted that the response received from the publisher may further include a second parameter instructing the subscriber to generate a fourth identifier in accordance with the second parameter and to use the fourth identifier for representing the matched service in a subsequent service query or follow-up message to prove its authenticity in order to obtain additional service information, which may be privacy-sensitive. As an illustrative example, the second parameter indicates a third truncated portion of a hash output to use in generating the fourth identifier. As another illustrative example, the second parameter indicates a third random number (i.e., a third nonce) to use in generating the fourth identifier. Then, the subscriber wishing to receive the additional service information generates the fourth identifier of the service name in accordance with the second parameter received and sends the subsequent service query or follow-up message including the fourth identifier. As a result, the subscriber may receive a second response including the additional service information from the publisher and pre-association service discovery may complete.

FIG. 5B illustrates a flow diagram of example operations 550 occurring in a publisher performing secured pre-association service discovery. Operations 550 may be indicative of operations occurring in a publisher as the publisher performs secured pre-association service discovery with a subscriber.

Operations 550 may begin with the publisher receiving a request, i.e., a service query message (block 555). The request may include a first identifier and a parameter. An identifier, such as the first identifier, may be a truncated hash output of the application of a hash function, such as SHA-256, to a service name, such as a service name of a service that the subscriber is seeking. The parameter may comprise a first indication indicating how to generate a third identifier to include in a response, i.e., a service response message, for representing a matched service, if the matched service is found in hash matching with the first identifier. As an illustrative example, the first indication indicates a first truncated portion of a hash output to use in generating the third identifier. As another illustrative example, the first indication indicates a first random number (i.e., a first nonce) to use in generating the third identifier. The parameter may further include a second indication indicating how to generate a second identifier used in hash matching with the first identifier. As an illustrative example, the second indication indicates a second truncated portion of a hash output to use as the second identifier in hash matching with the first identifier. As another illustrative example, the second indication indicates a second random number (i.e., a second nonce) to use in generating the second identifier used in hash matching with the first identifier. Detailed discussion of example embodiments involving the use of the parameters are provided below.

The publisher may generate the second identifier using a truncated portion of a hash output of the application of a hash function, such as SHA-256, to a service name of a service provided by the publisher (block 556). The publisher may generate the second identifier in accordance with the second indication in the parameter received, e.g., as described in one of the two illustrative examples above. The publisher may perform a check (i.e., the hash matching) to determine if the first identifier matches with the second identifier (block 557). If the first identifier matches with the second identifier, the publisher may generate the third identifier of the matched service in accordance with the first indication in the parameter received (block 559). The publisher may send the response, i.e., the service response message, including the third identifier to represent the matched service to the subscriber (block 561). The publisher may further include service information of the matched service in the response, such as the availability status of the service, certain parameters or attributes of the service, and so on. The publisher may further include a second parameter in the response, the second parameter indicating how the subscriber generates a fourth identifier to represent the matched service in a subsequent service query or a follow-up message that the subscriber sends to the publisher. As an illustrative example, the second parameter indicates a third truncated portion of a hash output to use in generating the fourth identifier. As another illustrative example, the second parameter indicates a third random number (i.e., a third nonce) to use in generating the fourth identifier. The second parameter is used by the publisher to generate a challenge to the subscriber in order to verify the authenticity of the subscriber through the subscriber's response to the challenge, which is the fourth identifier included in the subsequent service query or follow-up message. If the fourth identifier sent by the subscriber in the subsequent service query or follow-up message matches with the one anticipated by the publisher, the publisher may respond with additional service information, which may be privacy-sensitive. If the fourth identifier sent by the subscriber in the subsequent service query or follow-up message doesn't match with the one anticipated by the publisher, the publisher may consider the authenticity of the subscriber is not established and may abort any further response or disclosure of the related service information and terminate the pre-association service discovery. If the first identifier does not match with the second identifier of any service that the publisher provides in block 557, the publisher may consider that the request can't be met. Then, the publisher may provide no response or a negative response back to the subscriber and terminate the pre-association service discovery.

According to an example embodiment, the parameter specifies a portion of a hash output produced when a hash function is applied to a service name that is used as an identifier. Generally, the hash output is long and sending requests and/or responses with the hash output in its entirety may be wasteful in terms of signaling overhead. Therefore, sufficiently long portions of the hash outputs may be used to reduce signaling overhead. As an example, 6-octet portions of the hash output are used in place of the entire hash output.

As an illustrative example, a subscriber may send a service query message including one version of the truncated hash (e.g., HASH-1) of the service name to identify the service, and requests that a publisher, if finding the hash matches, respond by including a different version of the truncated hash (e.g., HASH-2) of the matched service name in the service response to prove its authenticity. It is assumed that for those services that privacy or security is a concern, the service name itself may be made in such a way that it can be used as a secret that is shared only among the intended parties. The subscriber may request a specific version of the truncated hash out of multiple pre-specified choices. If HASH-2 returned by the publisher doesn't match with HASH-2 known by the subscriber, the authenticity of the publisher is not established and the response may be discarded. Similarly, a publisher may request a subscriber to use a specific and yet different version of the truncated hash of the requested service name in a subsequent query or follow-up message. If the truncated hash returned by the subscriber doesn't match with the one anticipated (or known) by the publisher, the authenticity of the subscriber is not established and further service discovery exchanges or the disclosure of certain service information to the subscriber is disallowed. For this purpose, different versions of the truncated hash of the same service name should be statistically uncorrelated. Aspects of this disclosure are related to descriptions in co-assigned U.S. patent application: application Ser. No. 14/105,895, filed Dec. 13, 2013, which is incorporated by reference herein as if reproduced in its entirety. As described in co-assigned U.S. patent application Ser. No. 14/105,895, a simple way to generate difference versions of truncated hash of the same service name is to truncate different, and preferably non-overlapping, portions of the same hash output from the hash function. And if a hash function with good cryptographic properties, such as the SHA-256 hash function, is used, different and non-overlapping portions of the hash output of the same service name are totally uncorrelated.

Since the hash output of SHA-256 hash function is 256 bits long, it can produce five non-overlapping truncated hashes (to be used as different versions of Service Hash or Service ID), if each Service Hash is 6-octet long. And these different versions of Service Hash can be indexed sequentially for signaling purpose. For example, the first 6-octet (e.g. Octet 0 to Octet 5) of the hash output of SHA-256 hash function may form the first Service Hash of a service name and be indexed as version number 1, and the next 6-octet (e.g. Octet 6 to Octet 11) of the hash output of SHA-256 hash function may form the second Service Hash of the same service name and be indexed as version number 2, and so on. To increase the number of different versions that can be generated from SHA-256 hash function, an alternative way is to allow partially overlapping truncation patterns. For example, Bit 0 to Bit 47 of the hash output of SHA-256 hash function may form the first Service Hash of a service name and be indexed as version number 1, and the Bit 1 to Bit 48 of the hash output of SHA-256 hash function may form the second Service Hash of the same service name and be indexed as version number 2, and so on. In this way, 208 different versions of Service Hash can be produced from a hash output of SHA-256 hash function. However, some versions are somehow correlated with one another.

For signaling purpose, a subscriber may include one or more Hash Version Number fields in the service query message for each service that it is searching for, at least one Hash Version Number field indicating the hash version that the subscriber requests a publisher to use in the response in order to prove the authenticity of the publisher. Another Hash Version Number field may be included to indicate the hash version of the Service Hash that the subscriber has included in the service query message for the service that the subscriber is searching for. Similarly, a publisher may include one or more Hash Version Number fields in the service response message for each service that it is advertising or responding for, for example, one Hash Version Number field indicating the hash version of the Service Hash that the publisher has included in the service response message, and another Hash Version Number field indicating the hash version that the publisher requests the subscriber to use in the subsequent query or follow-up message in order to prove the authenticity of the subscriber.

FIG. 6A illustrates a flow diagram of example operations 600 occurring in a subscriber performing secured pre-association service discovery, wherein the parameter indicates a portion of the hash output to use in generating an identifier, which is used for representing a matched service in a service response message. Operations 600 may be indicative of operations occurring in a subscriber as the subscriber performs secured pre-association service discovery with a publisher, wherein the parameter indicates a portion of the hash output to use in generating an identifier, which is used for representing a matched service in a service response message. The parameter is used by the subscriber to generate a challenge to the publisher in order to verify the authenticity of the publisher through the publisher's response to the challenge, which is the identifier included in the service response message.

Operations 600 may begin with the subscriber generating a first identifier of a service name of a service that the subscriber is looking for (block 605). An identifier, such as the first identifier, may be a truncated portion of a hash output produced by applying a hash function, such as SHA-256, to a service name, such as the service name of the service that the subscriber is looking for, i.e., service_name_subscriber. For simplicity, the first identifier may be a pre-specified portion, such as the first 6 octets (i.e., Octet 0 to Octet 5), of the hash output. The subscriber may send a request, i.e., a service query message, with the first identifier and a parameter to a publisher (block 607). The parameter is used to indicate a first truncated portion of the hash output to use in generating a third identifier by the publisher. The subscriber may generate a second identifier in accordance with the parameter (block 609). As an illustrative example, if the parameter is equal to 3, then the second identifier is the third 6-octet portion (e.g., Octet 12 to Octet 17) of the hash output produced by applying the hash function to service_name_subscriber (and the third identifier is the third 6-octet portion (e.g., Octet 12 to Octet 17) of the hash output produced by applying the hash function to service_name_publisher by the publisher).

The subscriber may receive a response, i.e., a service response message, with a third identifier from the publisher (block 611). The third identifier is generated by the publisher from the service name of the service that the publisher is providing (i.e., service_name_publisher) and is generated in accordance with the parameter sent by the subscriber. The subscriber may perform a check to determine if the second identifier matches with the third identifier (block 613). If the second identifier matches with the third identifier, the response is valid (block 615) and pre-association service discovery may complete. If the second identifier does not match with the third identifier, the response is not valid and pre-association service discovery may be aborted or the subscriber may repeat pre-association service discovery with another publisher. It is noted that the response may further include a second parameter indicating a second truncated portion of the hash output, which is produced by applying the hash function to the service name, to use in generating a fourth identifier of the service name and to include the fourth identifier in a subsequent service query or follow-up message to prove its authenticity in order to obtain additional service information, which may be privacy-sensitive. Then, the subscriber wishing to receive the additional service information generates the fourth identifier of the service name in accordance with the second parameter (i.e., using the second truncated portion of the hash output) and sends the subsequent service query or follow-up message including the fourth identifier. As a result, the subscriber may receive a second response including the additional service information from the publisher.

FIG. 6B illustrates a flow diagram of example operations 650 occurring in a publisher performing secured pre-association service discovery, wherein the parameter indicates a portion of the hash output to use in generating an identifier, which is used for representing a matched service in a service response message. Operations 650 may be indicative of operations occurring in a publisher as the publisher performs secured pre-association service discovery with a subscriber, wherein the parameter indicates a portion of the hash output to use in generating an identifier, which is used for representing a matched service in a service response message. The parameter is used by the subscriber to generate a challenge to the publisher in order to verify the authenticity of the publisher through the publisher's response to the challenge, which is the identifier included in the service response message.

Operations 650 may begin with the publisher receiving a request, i.e., a service query message (block 655). The request may include a first identifier and a parameter. An identifier, such as the first identifier, may be a truncated portion of a hash output of the application of a hash function, such as SHA-256, to a service name, such as a service name of a service that the subscriber is seeking (service_name_subscriber). The parameter is used to indicate a first truncated portion of the hash output to use in generating a third identifier, which is to be included in a response for representing a matched service, if the matched service is found in a hash matching with the first identifier. The publisher may generate a second identifier using the same pre-specified truncated portion (as the first identifier), such as the first 6 octets (i.e., Octet 0 to Octet 5), of a hash output of the application of a hash function, such as SHA-256, to a service name of a service provided by the publisher (block 656). The publisher may perform a check to determine if the first identifier matches with the second identifier (block 657). If the first identifier matches with the second identifier, the publisher may generate a third identifier in accordance with the parameter (block 659). As an illustrative example, the third identifier is the N-th 6-octet portion of the hash output, where N is the value of the parameter. The publisher may send a response, i.e., a service response message, including the third identifier to the subscriber (block 661). The publisher may further include service information of the matched service in the response, such as the availability status of the service, certain parameters or attributes of the service, etc. The publisher may further include a second parameter in the response to the service query, the second parameter indicating how the subscriber generates a fourth identifier to represent the matched service in a subsequent service query or a follow-up message that the subscriber sends to the publisher. As an illustrative example, the fourth identifier is the M-th 6-octet portion of the hash output, where M is the value of the second parameter. The second parameter is used by the publisher to generate a challenge to the subscriber in order to verify the authenticity of the subscriber through the subscriber's response to the challenge, which is the fourth identifier included in the subsequent service query or follow-up message. If the fourth identifier sent by the subscriber in the subsequent service query or follow-up message matches with the one anticipated by the publisher, the publisher may respond with additional service information of the matched service, which may be privacy-sensitive. If the fourth identifier sent by the subscriber in the subsequent service query or follow-up message doesn't match with the one anticipated by the publisher, the publisher may consider the authenticity of the subscriber is not established and may abort any further response or disclosure of the related service information and terminate the pre-association service discovery. If the first identifier does not match with the second identifier of any service that the publisher provides in block 657, the publisher may consider that the request can't be met. Then, the publisher may provide no response or a negative response to the subscriber and terminate the pre-association service discovery.

This truncation based approach is relatively simple. But because the hash output is static and there are a limited number of non-overlapping truncation patterns, a patient hacker can wait until he collects all different versions before he starts to attack.

According to an example embodiment, the parameter is a nonce used to generate an identifier. The nonce may be concatenated with the service name prior to being applied to the hash function. The nonce may be added to the service name prior to being applied to the hash function. The co-assigned and incorporated U.S. patent application Ser. No. 14/105,895 described methods and apparatuses for generating difference Service Hashes from the same service name by using different strings or values.

As an illustrative example, a subscriber may send a service query message including one version of the truncated hash (e.g. HASH-1) of the service name to identify the service and one or more random numbers, and requests that a publisher, if finding the hash matches, respond using a truncated hash (e.g. HASH-3) of the matched service name, which is generated with the random number that is provided to the publisher by the subscriber, as an identifier of the service in order to prove the authenticity of the publisher. If HASH-3 returned by the publisher doesn't match with HASH-3 known by the subscriber, the authenticity of the publisher is not established and the response may be discarded. Similarly, a publisher may request a subscriber to use a truncated hash of the requested service name, which is generated with a random number provided to the subscriber by the publisher, to represent the matched service in a subsequent query or follow-up message. If the truncated hash returned by the subscriber doesn't match with the one anticipated by the publisher, the authenticity of the subscriber is not established and further service discovery exchanges with or the disclosure of certain service information to the subscriber is disallowed.

As mentioned before, a hacker can collect service identifiers and parameters used in generating these identifiers, which are transmitted by legitimate subscribers and publishers, by eavesdropping, and then replay the collected identifiers and parameters to impersonate a legitimate subscriber or publisher. In order to counter that, it is entirely possible that the legitimate subscriber and publisher keep challenging each other in each service discovery message exchange by providing the counterpart with a different nonce and ask the counterpart to use the nonce to generate a different identifier of the service in the subsequent message. For example, the subscriber first sends a message M1 with an identifier I1 of a sought service, a nonce N1 used in generating I1, and a nonce N2 used to generate a challenge to a publisher. If the publisher finds a matched service, the publisher sends a message M2 with an identifier I2 of the matched service, which is generated in accordance with N2, and a nonce N3 used to generate a challenge to the subscriber. If the subscriber determines that I2, which is received in M2, matches with what is expected, the subscriber sends a message M3 with an identifier I3 of the matched service, which is generated in accordance with N3, and a nonce N4 used to generate another challenge to the publisher. If the publisher determines that I3, which is received in M3, matches with what is expected, the publisher sends a message M4 with an identifier I4 of the matched service, which is generated in accordance with N4, and a nonce N5 used to generate yet another challenge to the subscriber. The process can continue until all service discovery message exchanges are completed. If the size of possible nonce value spaces is large enough, these nonce values generated by the subscriber or publisher may never repeat with each other.

In this example embodiment, the random numbers (i.e., nonce) provide much greater dynamics in the difference among the truncated hashes that can be generated. And if a hash function with good cryptographic properties, such as SHA-256 hash function, is used, even a slight difference between two random numbers will produce two uncorrelated hash outputs. And in this case, even if a single truncation function is used, the two truncated hashes are still highly uncorrelated. This challenge-and-response approach is more robust against replay attack, since it is almost impossible for a hacker to collect and memorize so many identifiers and the related random numbers in order to answer the challenge successfully in every step. For that reason and in light of the desired security and privacy, it is preferable to use the approach of using random numbers (i.e., nonces) in generating the identifiers of the service name. However, it also requires stations running the hash algorithm in real-time, thus is computationally demanding, especially for the responder station as the responder station will typically have less time to compute the hash than the challenger station.

Figures 7A, 7B:
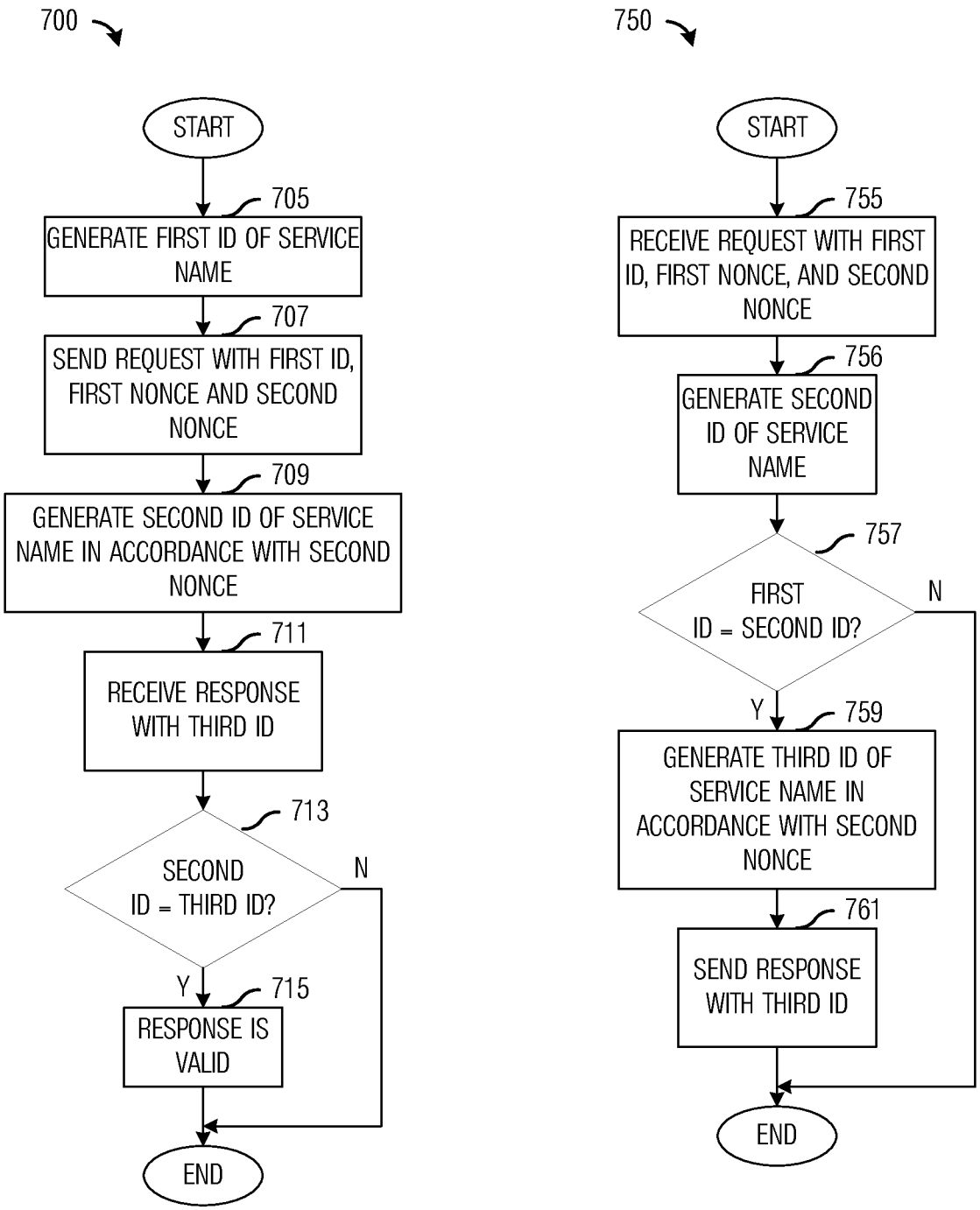
FIG. 7A illustrates a flow diagram of example operations occurring in a subscriber performing secured pre-association service discovery, wherein the parameter is a nonce according to example embodiments described herein.
FIG. 7B illustrates a flow diagram of example operations occurring in a publisher performing secured pre-association service discovery, wherein the parameter is a nonce according to example embodiments described herein.

FIG. 7A illustrates a flow diagram of example operations 700 occurring in a subscriber performing secured pre-association service discovery, wherein the parameter comprises one or more random numbers (nonce). Operations 700 may be indicative of operations occurring in a subscriber as the subscriber performs secured pre-association service discovery with a publisher, wherein the parameter comprises one or more random numbers (nonce).

Operations 700 may begin with the subscriber generating a first identifier of a service name of a service that the subscriber is looking for (block 705). The first identifier may be a pre-specified truncated portion, such as the first 6 octets, of a hash output produced by applying a hash function, such as SHA-256, to a service name of the service that the subscriber is looking for, i.e., service_name_subscriber. Alternatively, the first identifier may be a pre-specified truncated portion, such as the first 6 octets, of a hash output produced by applying a hash function, such as SHA-256, to a combined service name (through adding, concatenating, and so forth) of a first nonce and a service name of a service that the subscriber is looking for, i.e., service_name_subscriber. An identifier used in subsequent service discovery message exchange may be a pre-specified truncated portion, such as the first 6 octets, of a hash output produced by applying a hash function, such as SHA-256, to a combined service name (through adding, concatenating, and so forth) of a nonce and a service name. The subscriber may send a request, i.e., a service query message, with the first identifier and a parameter including the first nonce, only if it is used in generating the first identifier, and a second nonce to the publisher (block 707). The first nonce, if used in generating the first identifier, is also provided to the publisher for generating an identifier used in hash matching with the first identifier. The second nonce is used by the subscriber in generating a second identifier of the sought service and is also provided to the publisher for generating a third identifier of a matched service, if there is one, in order to represent the matched service in a response, i.e., a service response message. The subscriber may generate the second identifier in accordance with the second nonce in the parameter (block 709). As an illustrative example, if the second nonce is equal to 3, then the second identifier is generated by combining (e.g., adding, concatenating, and so forth) the second nonce of "3" with service_name_subscriber and applying the hash function to combined service name. For simplicity, the second identifier may use the same pre-specified truncated portion of the hash output as the first identifier, such as the first 6 octets of the hash output.

The subscriber may receive a response, i.e., a service response message, with the third identifier from the publisher (block 711). The third identifier is generated by the publisher from the service name of the service that the publisher is providing (i.e., service_name_publisher) and is generated in accordance with the second nonce in the parameter sent by the subscriber. The third identifier may use the same pre-specified truncated portion of the hash output as the first identifier does, such as the first 6 octets of the hash output. The subscriber may perform a check to determine if the second identifier matches with the third identifier (block 713). If the second identifier matches with the third identifier, the response is valid (block 615) and pre-association service discovery may complete. If the second identifier does not match with the third identifier, the response is not valid and pre-association service discovery may be aborted or the subscriber may repeat pre-association service discovery with another publisher. It is noted that the response may further include a second parameter instructing the subscriber to generate a fourth identifier in accordance with the second parameter and to use the fourth identifier for representing the matched service in a subsequent service query or follow-up message to prove its authenticity in order to obtain additional service information, which may be privacy-sensitive. As an illustrative example, the second parameter indicates a third random number (i.e., a third nonce) to use in generating the fourth identifier. Then, the subscriber wishing to receive the additional service information generates the fourth identifier of the service name in accordance with the second parameter received and sends the subsequent service query or follow-up message including the fourth identifier. As a result, the subscriber may receive a second response including the additional service information from the publisher and pre-association service discovery may complete.

FIG. 7B illustrates a flow diagram of example operations 750 occurring in a publisher performing secured pre-association service discovery, wherein the parameter comprises one or more random numbers (nonce). Operations 750 may be indicative of operations occurring in a publisher as the publisher performs secured pre-association service discovery with a subscriber, wherein the parameter comprises one or more random numbers (nonce).

Operations 750 may begin with the publisher receiving a request, i.e., a service query message (block 755). The request may include a first identifier and a parameter. The parameter may include a first nonce, only if it is used in generating the first identifier, and a second nonce. The first identifier may be a pre-specified truncated portion, such as the first 6 octets, of a hash output produced by applying a hash function, such as SHA-256, to a service name of the service that the subscriber is looking for, i.e., service_name_subscriber. Alternatively, the first identifier may be a pre-specified truncated portion, such as the first 6 octets, of a hash output produced by applying a hash function, such as SHA-256, to a combined service name (through adding, concatenating, and so forth) of the first nonce and a service name of a service that the subscriber is looking for, i.e., service_name_subscriber. An identifier used in subsequent service discovery message exchange may be a truncated portion of a hash output of the application of a hash function, such as SHA-256, to a combined service name (through adding, concatenating, and so forth) of a nonce and a service name. The first nonce, if used by the subscriber in generating the first identifier, is also used by the publisher in generating a second identifier, which is used for hash matching with the first identifier. The second nonce is used for generating a third identifier of a matched service, if there is one, in order to represent the matched service in a response, i.e. a service response message. The publisher may generate the second identifier using the same pre-specified truncated portion (as the first identifier does), such as the first 6 octets (i.e., Octet 0 to Octet 5), of a hash output of the application of a hash function, such as SHA-256, to a service name of a service provided by the publisher (block 756). Alternatively, if the first nonce is used in generating the first identifier by the subscriber and is provided to the publisher in the request, the publisher may generate the second identifier using the same pre-specified truncated portion (as the first identifier), such as the first 6 octets (i.e., Octet 0 to Octet 5), of a hash output of the application of a hash function, such as SHA-256, to a combined service name (through adding, concatenating, and so forth) of the first nonce and a service name of a service provided by the publisher, i.e., service_name_publisher. The publisher may perform a check to determine if the first identifier matches with the second identifier (block 757). If the first identifier matches with the second identifier, the publisher may generate a third identifier in accordance with the second nonce (block 759). As an illustrative example, the third identifier is a truncated portion of a hash output of a combination of service_name_publisher and the second nonce. The third identifier may use the same pre-specified truncated portion of the hash output as the first and second identifiers do, such as the first 6 octets of the hash output. The publisher may send a response, i.e., a service response message, including the third identifier to the subscriber (block 761). The publisher may further include service information of the matched service in the response, such as the availability status of the service, certain parameters or attributes of the service, and so forth. The publisher may further include a third nonce in the response to the service query. The third nonce is provided to the subscriber for generating a fourth identifier to represent the matched service in a subsequent service query or a follow-up message that the subscriber sends to the publisher. The third nonce is used by the publisher to generate a challenge to the subscriber in order to verify the authenticity of the subscriber through the subscriber's response to the challenge, which is the fourth identifier included in the subsequent service query or follow-up message. If the fourth identifier sent by the subscriber in the subsequent service query or follow-up message matches with the one anticipated by the publisher, the publisher may respond with additional service information, which may be privacy-sensitive. If the fourth identifier sent by the subscriber in the subsequent service query or follow-up message doesn't match with the one anticipated by the publisher, the publisher may consider the authenticity of the subscriber is not established and may abort any further response or disclosure of the related service information and terminate the pre-association service discovery. If the first identifier does not match with the second identifier of any service that the publisher provides in block 757, the publisher may consider that the request can't be met. Then, the publisher may provide no response or a negative response to the subscriber and terminate the pre-association service discovery.

According to an example embodiment, the privacy of the subscriber is protected by performing a fast authentication (such as IEEE 802.11ai FILS authentication) with the publisher prior to performing pre-association service discovery. The fast authentication does not involve association or address assignment, thereby reducing latency. The fast authentication results in the establishment of keys that may be used to protect the service names.

Figure 8:
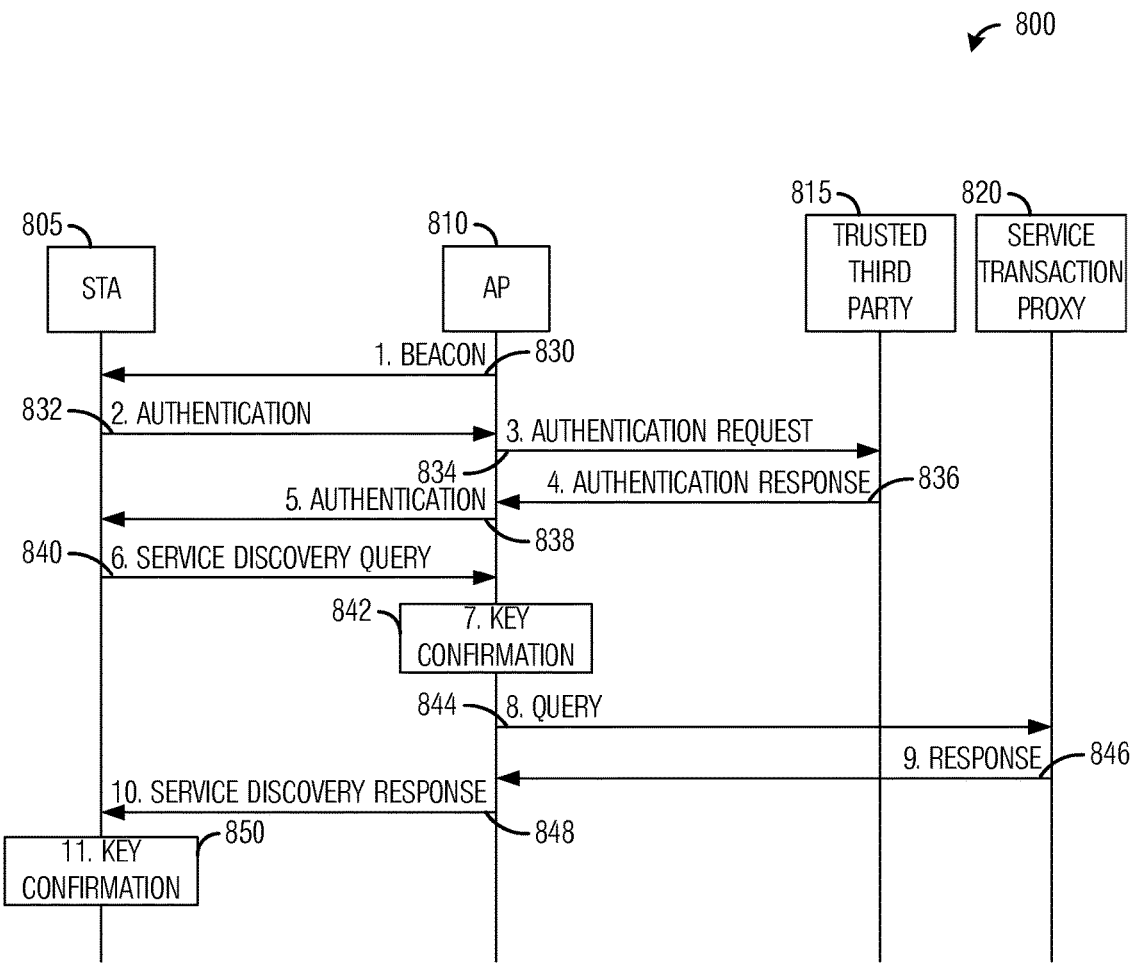
FIG. 8 illustrates a message exchange diagram highlighting fast authentication and pre-association service discovery according to example embodiments described herein.

FIG. 8 illustrates a message exchange diagram 800 highlighting fast authentication and pre-association service discovery. Message exchange diagram 800 displays messages exchanged between a station 805, an AP 810, a trusted third party 815, and a Service Transaction Proxy 820.

Station 805 first discovers the authentication policy of AP 810 through passive monitoring of beacon frames sent by AP 810 (shown as event 830). Alternative, station 805 may use active probing to discover the authentication policy of AP 810 by sending a Probe Request and receiving a Probe Response as a result. It is noted that the Probe Request and Probe Response messages are not shown in FIG. 8. If the authentication policy of AP 810 indicates that AP 810 supports fast authentication, e.g., AP 810 is connected with a mutually trusted thirty party 815 for authentication, then station 805 initiates fast authentication by sending an Authentication frame with the authentication information (e.g., FILS Authentication information) to AP 810 (shown as event 832). AP 810 forwards the FILS Authentication information to trusted third party 815 (shown as event 834). Upon receiving a response from trusted third party 815 (shown as event 836), AP 810 responds to station 805 with an Authentication frame with authentication information (shown as event 838). As a result of the exchange of messages shown in events 832-838, station 805 and AP 810 generate a pair-wise master key (PMK).

Station 805 sends a Service Discovery Query frame, including a service identifier of the service that it is looking for and a proof-of-possession of the correct PMK, to AP 810 (shown as event 840). AP 810 performs key confirmation (block 842). If key confirmation is successful, AP 810 will forward the service query to Service Transaction Proxy 820 (shown as event 844). And if the key confirmation is not successful, AP 810 may discard the service discovery query. Upon receiving a response from Service Transaction Proxy 820 (shown as event 846), AP 810 sends a Service Discovery Response frame back to STA 805 with the service information received from Service Transaction Proxy 820 (shown as event 848). AP 810 also includes its proof-of-possession of the PMK in the Service Discovery Response frame. Station 805 performs key confirmation (block 850). If key confirmation is successful, station 805 will further process the service discovery response. If the key confirmation is not successful, station 805 may discard the service discovery response.

The two-way handshake messages for the fast authentication may also be carried in the initial service query and service response using some Public Actions frames such as the GAS Request and GAS Response frames. Similar to 802.11ai, the key establishment is performed during the authentication frames and the key confirmation is performed during the subsequent service query and service response frames. With the shared secret key established, the contents in the service discovery query and service discovery response messages may be protected by encryption. The publisher (e.g., AP 810) doesn't respond to the service discovery query until it successfully performs the key confirmation performed on the service discovery query frame. The subscriber (e.g., station 805) doesn't accept the service discovery response as a valid one until it successfully performs the key confirmation performed on the service discovery response frame.

Figure 9A:
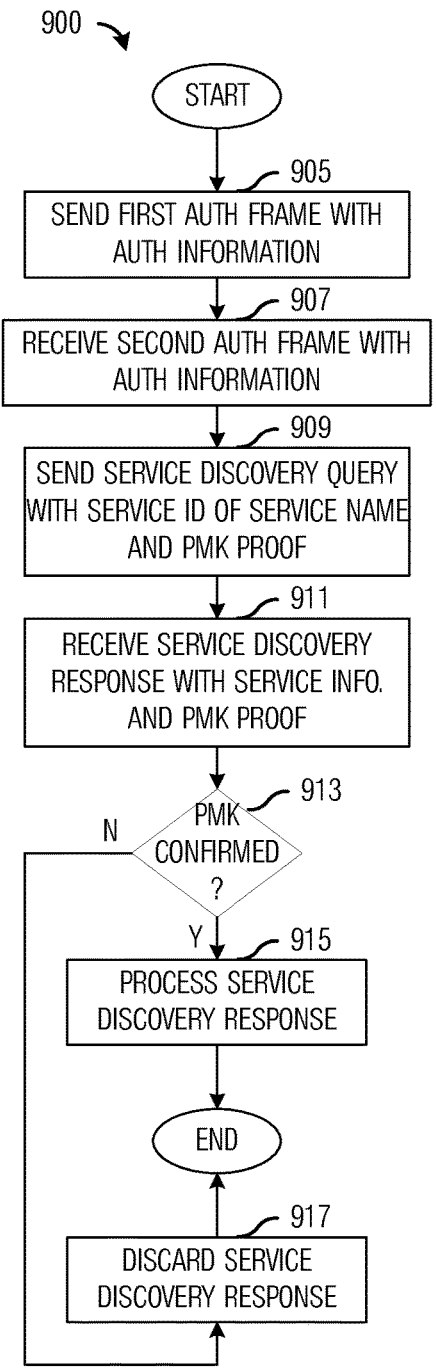
FIG. 9A illustrates a flow diagram of example operations occurring in a subscriber participating in fast authentication and pre-association service discovery according to example embodiments described herein.

FIG. 9A illustrates a flow diagram of example operations 900 occurring in a subscriber participating in fast authentication and pre-association service discovery. Operations 900 may be indicative of operations occurring in a subscriber as the subscriber participates in fast authentication and pre-association service discovery.

Operations 900 may begin, after the subscriber discovers that the publisher supports fast authentication, with the subscriber sending a first authentication frame with authentication information to the publisher (block 905). The authentication information may be in the form of FILS Authentication information. The subscriber may receive a second authentication frame with authentication information from the publisher (block 907). The exchange of authentication frames generates a PMK. The subscriber sends a Service Discovery Query with a service identifier and PMK proof (block 909). The subscriber receives a Service Discovery Response with service information and PMK proof (block 911). The subscriber performs key confirmation (block 913). If the key confirmation succeeds, the subscriber processes the Service Discovery Response (block 915). If the key confirmation fails, the subscriber discards the Service Discovery Response (block 917).

Figure 9B:
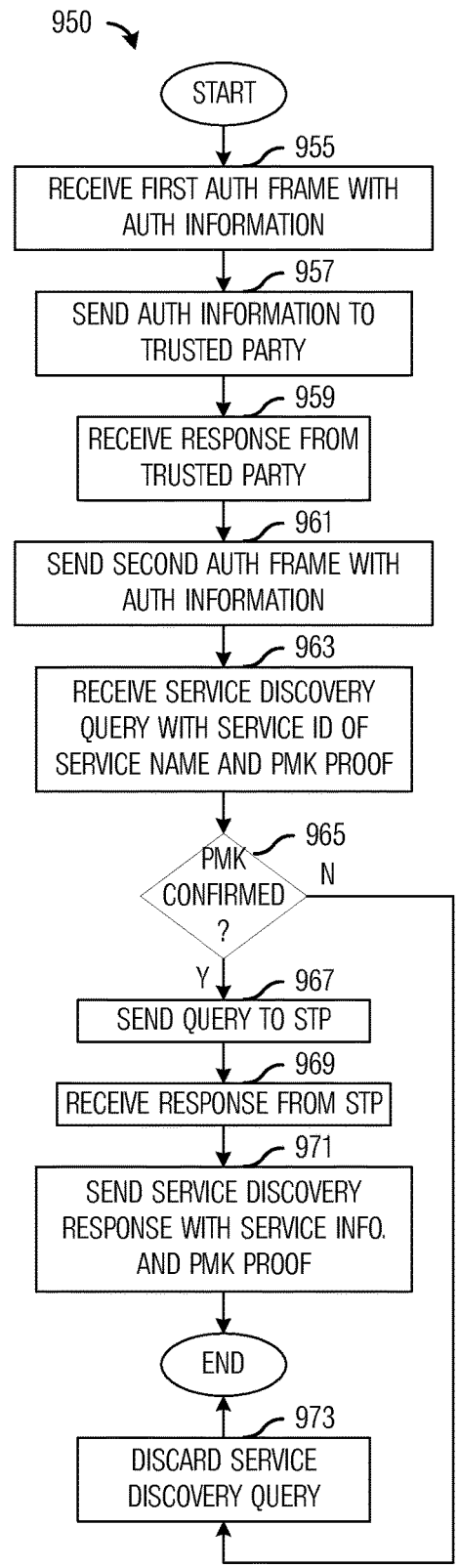
FIG. 9B illustrates a flow diagram of example operations occurring in a publisher participating in fast authentication and pre-association service discovery according to example embodiments described herein.

FIG. 9B illustrates a flow diagram of example operations 950 occurring in a publisher participating in fast authentication and pre-association service discovery. Operations 950 may be indicative of operations occurring in a publisher as the publisher participates in fast authentication and pre-association service discovery.

The publisher receives a first authentication frame with authentication information from the subscriber (block 955). The authentication information may be in the form of FILS Authentication information. The publisher sends the authentication information to the trusted third party (block 957). The publisher receives a response from the trusted third party (block 959) and sends a second authentication frame including authentication information to the subscriber (block 961). The exchange of authentication frames generates a PMK. The publisher receives a Service Discovery Query with a service identifier and PMK proof from the subscriber (block 963). The publisher performs key confirmation (block 965). If the key confirmation succeeds, the publisher sends a query to the STP (block 967) and receives a response from the STP (block 969). The publisher sends a Service Discovery Response including service information and PMK proof to the subscriber (block 971). If the key confirmation fails, the subscriber discards the Service Discovery Query (block 973).

Figure 10:
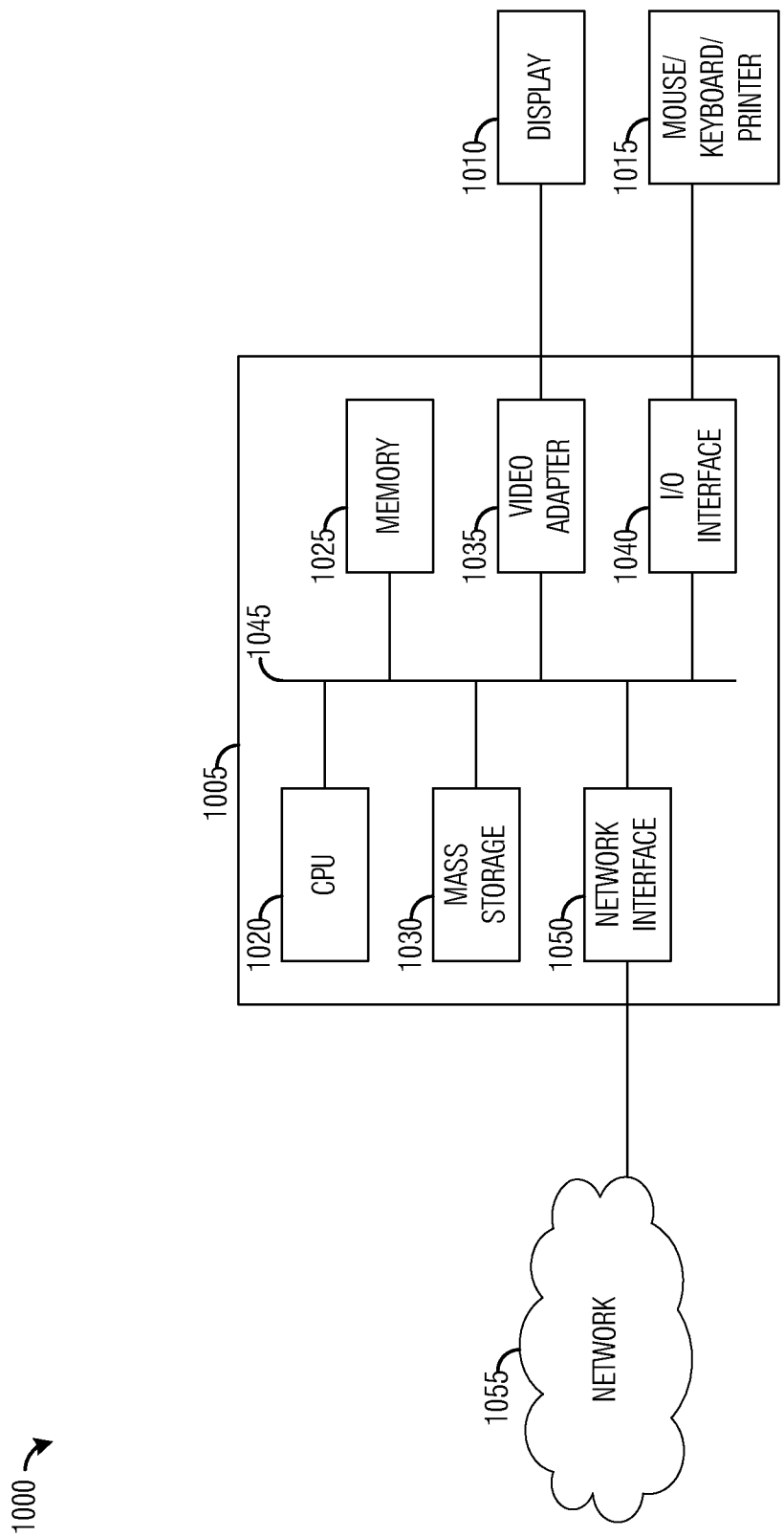
FIG. 10 is a block diagram of a processing system that may be used for implementing the devices and methods disclosed herein.

FIG. 10 is a block diagram of a processing system 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1005. Processing unit 1005 may be equipped with one or more input/output devices, such as a human interface 1015 (including speaker, microphone, mouse, touchscreen, keypad, keyboard, printer, and the like, for example), display 1010, and so on. The processing unit may include a central processing unit (CPU) 1020, memory 1025, a mass storage device 1030, a video adapter 1035, and an I/O interface 1040 connected to a bus 1045.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 1050, which may comprise wired links, such as an Ethernet cable or the like, and/or wireless links to access nodes or different networks 1055. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present embodiment and its advantages have been described in detail, it should be understood that various changes, substitutions and alterations can be made herein without departing from the spirit and scope of the disclosure as defined by the appended claims.

What is claimed is:

1. A method for operating a first station in discovering a service, the method comprises:

generating, by the first station, a first identifier of the service;

generating, by the first station, a second identifier of the service in accordance with a first parameter;

transmitting, by the first station, a request instructing a generating of a third identifier of the service by a second station, the request including the first identifier of the service and the first parameter;

receiving, by the first station from the second station, a first response including the third identifier of the service;

determining, by the first station, that the first response is valid in response to the second identifier of the service and the third identifier of the service being equal; and in response to the first response being valid, establishing, by the first station, a connection for the service with the second station.

2. The method of claim 1, wherein the first identifier is generated in accordance with a first process, the second identifier is generated in accordance with a second process, and the first parameter instructs that the third identifier is to be generated in accordance with the second process.

3. The method of claim 2, wherein generating the first identifier in accordance with the first process comprises:
hashing a service name of the service using a hash function, thereby producing a hash output; and
truncating a first portion of the hash output to produce the first identifier, and wherein generating the second identifier in accordance with the second process comprises truncating a second portion of the hash output to produce the second identifier.

4. The method of claim 3, wherein generating the second identifier of the service further comprises hashing the service name of the service using the hash function.

5. The method of claim 3, wherein the first response further includes service information of the service.

6. The method of claim 3, wherein the first response further includes a request for a fourth identifier of the service and a second parameter instructing a generating of the fourth identifier by the first station in accordance with a third process, and wherein the method further comprises:
generating the fourth identifier of the service in accordance with the third process by truncating a third portion of the hash output to produce the fourth identifier of the service;
transmitting, to the second station, a second response including the fourth identifier; and
receiving, from the second station, a third response including service information of the service.

7. The method of claim 1, wherein the first parameter comprises a first nonce value used in generating the third identifier and the second identifier, wherein generating the second identifier comprises:
combining the first nonce value and a service name of the service to produce a first modified service name, wherein combining the first nonce value and the service name comprises one of concatenating a string representing the first nonce value to the service name or applying a mathematical function to a value representing the service name and the first nonce value;
hashing the first modified service name using a hash function, thereby producing a first hash output; and
truncating a pre-specified portion of the first hash output to produce the second identifier.

8. The method of claim 7, wherein the first parameter further includes a second nonce value used in generating the first identifier, wherein generating the first identifier comprises:
combining the second nonce value and the service name of the service to produce a second modified service name;
hashing the second modified service name using the hash function, thereby producing a second hash output; and
truncating the pre-specified portion of the second hash output to produce the first identifier.

9. The method of claim 7, wherein generating the first identifier comprises:
hashing the service name using the hash function, thereby producing a third hash output; and
truncating the pre-specified portion of the third hash output to produce the first identifier.

10. The method of claim 7, wherein the first response further includes service information of the service.

11. The method of claim 7, wherein the first response further includes a request for a fourth identifier of the service and a third nonce value used in generating the fourth identifier by the first station, and wherein the method further comprises:
generating the fourth identifier of the service in accordance with the third nonce value;
transmitting, to the second station, a second response including the fourth identifier; and
receiving, from the second station, a third response including service information of the service.

12. The method of claim 11, wherein generating the fourth identifier of the service comprises:
combining the third nonce value and the service name of the service to produce a third modified service name;
hashing the third modified service name using the hash function, thereby producing a fourth hash output; and
truncating the pre-specified portion of the fourth hash output to produce the fourth identifier.

13. A first station adapted to discover a service, the first station comprising:
a processing unit configured to:
generate a first identifier of the service,
generate a second identifier of the service, wherein the second identifier is generated in accordance with a first parameter,
determine that a first response is valid in response to the second identifier of the service and a third identifier of the service being equal, and
in response to the first response being valid, establish a connection for the service with a second station;
a transmitter operatively coupled to the processing unit, the transmitter configured to transmit a request instructing a generating of the third identifier of the service by the second station, the request including the first identifier of the service and the first parameter; and
a receiver operatively coupled to the processing unit, the receiver configured to receive, from the second station, a first response including the third identifier of the service.

14. The first station of claim 13, wherein the first identifier is generated in accordance with a first process, the second identifier is generated in accordance with a second process, and the first parameter instructs that the third identifier is to be generated in accordance with the second process.

15. The first station of claim 14, wherein the processing unit is configured to:
hash a service name of the service using a hash function to produce a hash output,
truncate a first portion of the hash output to produce the first identifier, and
truncate a second portion of the hash output to produce the second identifier.

16. The first station of claim 15, wherein the first response further includes a request for a fourth identifier of the service and a second parameter instructing a generating of the fourth identifier by the first station in accordance with a third process, and wherein the processing unit is configured to:
generate the fourth identifier of the service in accordance with the third process by truncating a third portion of the hash output to produce the fourth identifier of the service,
transmit, to the second station, a second response including the fourth identifier, and receive, from the second station, a third response including service information of the service.

17. The first station of claim 13, wherein the first parameter comprises a first nonce value used in generating the third identifier and the second identifier, and wherein the processing unit is configured to:
   combine a service name of the service with the first nonce value to produce a first modified service name, wherein the processing unit is configured to combine the service name with the first nonce value by one of concatenating a string representing the first nonce value to the service name or applying a mathematical function to a value representing the service name and the first nonce value,
   apply a hash function to the first modified service name to produce a first hash output, and
   truncate a pre-specified portion of the first hash output to produce the second identifier.

18. The first station of claim 17, wherein the first parameter further includes a second nonce value used in generating the first identifier, wherein the processing unit is configured to:
   combine the service name with the second nonce value to produce a second modified service name,
   apply the hash function to the second modified service name to produce a second hash output, and
   truncate the pre-specified portion of the second hash output to produce the first identifier.

19. The first station of claim 17, wherein the processing unit is configured to:
   apply the hash function to the service name to produce a third hash output, and
   truncate the pre-specified portion of the third hash output to produce the first identifier.

20. The first station of claim 17, wherein the first response further includes a request for a fourth identifier of the service and a third nonce value instructing a generating of the fourth identifier by the first station, and wherein the processing unit is configured to:
   generate the fourth identifier of the service in accordance with the third nonce value,
   transmit, to the second station, a second response including the fourth identifier, and
   receive, from the second station, a third response including service information of the service.

21. The first station of claim 20, wherein the processing unit is configured to:
   combine the service name with the third nonce value to produce a third modified service name,
   apply the hash function to the third modified service name to produce a fourth hash output, and
   truncate the pre-specified portion of the fourth hash output to produce the fourth identifier of the service.

22. A method for operating a first station in advertising a service, the method comprises:
   receiving, by the first station from a second station, a request including a first identifier of the service and a first parameter;
   generating, by the first station, a second identifier of the service; and
   in response to determining, by the first station, that the first and second identifiers of the service are equal:
      generating, by the first station, a third identifier of the service in accordance with the first parameter received from the second station,
      transmitting, by the first station to the second station, a first response including the third identifier of the service; and
      establishing, by the first station, a connection to provide the service to the second station.

23. The method of claim 22, wherein the first response further includes service information of the service.

24. The method of claim 22, wherein the first and second identifiers are generated in accordance with a first process, the third identifier is generated in accordance with a second process, and the first parameter instructs that the third identifier is to be generated in accordance with the second process.

25. The method of claim 24, wherein generating the second identifier in accordance with the first process comprises:
   hashing a service name of the service using a hash function, thereby producing a hash output; and
   truncating a first portion of the hash output to produce the second identifier, and wherein generating the third identifier in accordance with the second process comprises
   truncating a second portion of the hash output to produce the third identifier.

26. The method of claim 25, wherein the first response further includes a request for a fourth identifier and a second parameter instructing a generating of the fourth identifier by the second station in accordance with a third process, and wherein the method further comprises:
   generating a fifth identifier of the service in accordance with the third process by truncating a third portion of the hash output to produce the fifth identifier of the service;
   receiving, from the second station, a second response including the fourth identifier; and
   transmitting, to the second station, a third response including service information of the service in response to determining that the fourth and fifth identifiers are equal.

27. The method of claim 22, wherein the first parameter comprises a first nonce value used in generating the third identifier, wherein generating the third identifier comprises:
   combining the first nonce value and a service name of the service to produce a first modified service name by one of concatenating a string representing the first nonce value to the service name or applying a mathematical function to a value representing the service name and the first nonce value;
   hashing the first modified service name using a hash function, thereby producing a first hash output; and
   truncating a pre-specified portion of the first hash output to produce the third identifier.

28. The method of claim 27, wherein the first parameter further includes a second nonce value used in generating the second identifier, and wherein generating the second identifier comprises:
   combining the second nonce value and the service name of the service to produce a second modified service name;
   hashing the second modified service name using the hash function, thereby producing a second hash output; and
   truncating the pre-specified portion of the second hash output to produce the second identifier.

29. The method of claim 27, wherein generating the second identifier comprises:
   hashing the service name using the hash function, thereby producing a third hash output; and
   truncating the pre-specified portion of the third hash output to produce the second identifier.

30. The method of claim 27, wherein the first response further includes a request for a fourth identifier of the service and a third nonce value to be used in generating the fourth identifier by the second station, and wherein the method further comprises:
generating a fifth identifier of the service in accordance with the third nonce value;
receiving, from the second station, a second response including the fourth identifier; and
transmitting, to the second station, a third response including service information of the service in response to determining that the fourth and fifth identifiers are equal.

31. The method of claim 30, wherein generating the fifth identifier of the service comprises:
combining the third nonce value and the service name of the service to produce a third modified service name;
hashing the third modified service name using the hash function, thereby producing a fourth hash output; and
truncating the pre-specified portion of the fourth hash output to produce the fifth identifier.

32. A first station adapted to advertise a service, the first station comprising:
a receiver configured to receive, from a second station, a request including a first identifier of the service and a first parameter;
a processing unit operatively coupled to the receiver, the processing unit configured to:
generate a second identifier of the service, and
in response to the first and second identifiers of the service being equal:
generate a third identifier of the service in accordance with the first parameter received from the second station, and
establish a connection to provide the service to the second station; and
a transmitter operatively coupled to the processing unit, the transmitter configured to transmit, to the second station, a first response including the third identifier of the service.

33. The first station of claim 32, wherein the first and second identifiers are generated in accordance with a first process, the third identifier is generated in accordance with a second process, and the first parameter instructs that the third identifier is to be generated in accordance with the second process, and wherein the processing unit is configured to:
hash a service name of the service using a hash function to produce a hash output,
truncate a first portion of the hash output to produce the second identifier, and
truncate a second portion of the hash output to produce the third identifier.

34. The first station of claim 33, wherein the first response further includes a request for a fourth identifier and a second parameter instructing a generating of the fourth identifier by the second station in accordance with a third process, and wherein the processing unit is configured to:
generate a fifth identifier of the service in accordance with the third process by truncating a third portion of the hash output to produce the fifth identifier of the service,
receive, from the second station, a second response including the fourth identifier, and
transmit, to the second station, a third response including service information of the service in response to determining that the fourth and fifth identifiers are equal.

35. The first station of claim 32, wherein the first parameter comprises a first nonce value used in generating the third identifier, and wherein the processing unit is configured to:
combine the first nonce value and a service name of the service to produce a first modified service name by one of concatenating a string representing the first nonce value to the service name or applying a mathematical function to a value representing the service name and the first nonce value,
hash the first modified service name using a hash function, thereby producing a first hash output, and
truncate a pre-specified portion of the first hash output to produce the third identifier.

36. The first station of claim 35, wherein the first parameter further includes a second nonce value used in generating the second identifier, and wherein the processing unit is configured to:
combine the second nonce value and the service name of the service to produce a second modified service name,
hash the second modified service name using the hash function to produce a second hash output, and
truncate the pre-specified portion of the second hash output to produce the second identifier.

37. The first station of claim 35, wherein the processing unit is configured to:
hash the service name using the hash function to produce a third hash output, and
truncate the pre-specified portion of the third hash output to produce the second identifier.

38. The first station of claim 35, wherein the first response further includes a request for a fourth identifier of the service and a third nonce value to be used in generating the fourth identifier by the second station, and wherein the processing unit is configured to:
generate a fifth identifier of the service in accordance with the third nonce value,
receive, from the second station, a second response including the fourth identifier, and
transmit, to the second station, a third response including service information of the service in response to determining that the fourth and fifth identifiers are equal.

39. The first station of claim 38, wherein the processing unit is configured to:
combine the third nonce value and the service name of the service to produce a third modified service name,
hash the third modified service name using the hash function to produce a fourth hash output, and
truncate the pre-specified portion of the fourth hash output to produce the fifth identifier.

* * * * *